United States Patent
Ortega et al.

(10) Patent No.: US 6,535,848 B1
(45) Date of Patent: Mar. 18, 2003

(54) METHOD AND APPARATUS FOR TRANSCRIBING MULTIPLE FILES INTO A SINGLE DOCUMENT

(75) Inventors: Kerry A. Ortega, Raleigh, NC (US); James R. Lewis, Delray Beach, FL (US); Ronald Vanbuskirk, Indiantown, FL (US); Huifang Wang, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/327,924

(22) Filed: Jun. 8, 1999

(51) Int. Cl.7 .......................... G10L 15/26; G06F 17/30
(52) U.S. Cl. .......................... 704/235; 704/270; 707/1; 707/201
(58) Field of Search ................. 704/260, 235, 704/270, 270.1; 707/1, 2, 7, 6, 201, 203, 205; 369/25.01; 348/14.08, 14.09

(56) References Cited

U.S. PATENT DOCUMENTS

| | | | |
|---|---|---|---|
| 4,468,751 A | | 8/1984 | Plunkett, Jr. |
| 4,908,866 A | | 3/1990 | Goldwasser et al. |
| 5,008,871 A | | 4/1991 | Howells et al. |
| 5,606,643 A | * | 2/1997 | Balasubramanian et al. .. 704/43 |
| 5,649,060 A | * | 7/1997 | Ellozy et al. ................. 704/78 |
| 5,710,591 A | * | 1/1998 | Bruno et al. .................. 348/15 |
| 5,761,529 A | * | 6/1998 | Raji et al. ....................... 710/4 |
| 5,794,249 A | * | 8/1998 | Orsolini et al. ............. 707/104 |
| 5,835,667 A | * | 11/1998 | Wactlar et al. ................ 386/96 |
| 6,076,059 A | * | 6/2000 | Glickman et al. .......... 704/260 |

FOREIGN PATENT DOCUMENTS

| | | | | |
|---|---|---|---|---|
| GB | 2 082 820 | * | 3/1982 | ............. G10L/1/00 |
| GB | 2 323 693 | * | 9/1998 | ............. G10L/3/00 |
| GB | 2 323 694 | * | 9/1998 | ............. G10L/3/00 |

* cited by examiner

Primary Examiner—Marsha D. Banks-Harold
Assistant Examiner—Abul K. Azad
(74) Attorney, Agent, or Firm—Akerman Senterfitt (57) ABSTRACT

A transcription system (100, 200) includes multiple recording devices (110, 210) that individually record and store (516), into multiple files, digital data representing speech uttered by multiple speakers. In a preferred embodiment, time stamps are stored (514) along with the speech. A transcription computer (120, 230) enables a user to select (602) which of multiple files the user would like to have transcribed, and to associate (604) a speaker ID to each of the multiple files. The transcription computer then transcribes (1006) phrases within the multiple files, and stores (1008) those phrases in a sequential order, based on the time stamps. The user may also cause an offset time for each file to be adjusted (606, 916), thus affecting the ultimate sequential order of the transcribed phrases. After transcription, the user may edit (1104) the time stamps, speaker IDs, and/or phrases.

19 Claims, 8 Drawing Sheets

METHOD AND APPARATUS FOR TRANSCRIBING MULTIPLE FILES INTO A SINGLE DOCUMENT

BACKGROUND OF THE INVENTION

The field of the invention is transcribing speech data using speech-to-text conversion techniques. More particularly, the invention relates to transcribing speech data from multiple files into a single document using speech-to-text conversion techniques.

Transcription is an old art that, up until the relatively recent past, has been performed by manually typing a recorded message into an electronic or physical document. More recently, speech-to-text conversion techniques have been employed to automatically convert recorded speech into text.

A difficulty arises with manual or automatic transcription techniques when multiple speakers are recorded onto a single recording (e.g., as in a recorded meeting or court proceeding). In most cases, it is desirable to identify which of the multiple speakers uttered the various phrases being transcribed. This is particularly true in court proceedings, for example, where an attorney may utter some phrases, a witness may utter others, and a judge may utter still others.

In order to automatically associate an individual with a phrase, it would be necessary to couple speaker recognition technology with the speech-to-text conversion software. Typically, however, speaker recognition technology requires the speaker recognition software to be trained by each of the speakers. Training is not always feasible, and the necessity for training would limit the usefulness of the transcription system.

Therefore, other methods of separating each speaker's uttered phrases are desirable. In some prior art techniques, each speaker is provided with a separate microphone, and the signals are combined into a single recording. A transcriber would then listen to the recordings and attempt to type the speakers' statements in sequential order. However, this solution is non-optimal, because it requires the transcriber to differentiate between multiple speakers whose voices may not be distinctive, or who may be talking over each other at the same time. In addition, the solution has not been successfully integrated with automated techniques of speech-to-text conversion and speaker recognition. Thus, the solution is inefficient because it relies on the use of a human transcriber.

What is needed is a method and apparatus for transcribing recordings of multiple simultaneous speakers. What is further needed is a method and apparatus for transcribing such recordings in an automated manner which takes into account the issues of recording synchronization and speaker identification.

SUMMARY OF THE INVENTION

The present invention includes an apparatus and method for transcribing speech originating from multiple speakers.

A general object of the invention is to automatically transcribe speech from multiple speakers in a manner that each speaker is identified in the transcription, but without the use of speaker recognition technology.

Another object of the invention is to automatically and accurately transcribe speech from multiple speakers who are talking simultaneously, while identifying the speakers in the transcription.

The method for transcribing the speech accesses multiple files of digitized speech data, which represent multiple speech recordings that were recorded within a recording session. The multiple files are then transcribed by applying a speech-to-text conversion technique to phrases within the multiple files, resulting in textual representations of the phrases. The textual representations are stored in a sequential order, resulting in a single sequence of textual representations of the digitized phrases from the multiple files.

Audio representations of the digitized phrases can be output to a speaker, and offset times for each of the files can be adjusted, where the offset times indicate time differences between the beginning of the recording session and the beginnings of the files.

The method can be executed by a machine that executes a plurality of code sections of a computer program that is stored on a machine readable storage.

The method is carried out by a transcription apparatus which includes at least a processor and a memory device. The processor accesses the multiple files, transcribes the phrases, and stores textual representations of the phrases in a sequential order in a combined file. The memory device stores the textual representations.

DESCRIPTION OF THE PREFERRED EMBODIMENT

Figure 1:
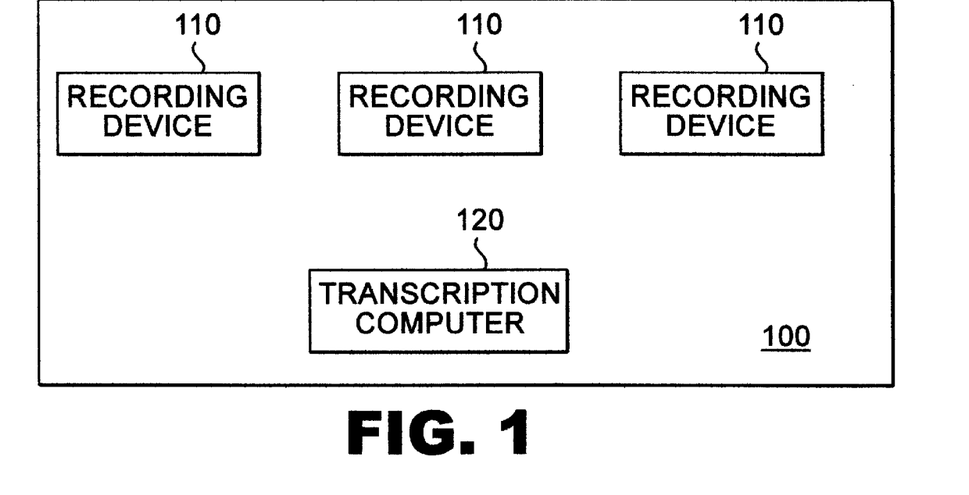
FIG. 1 illustrates a simplified block diagram of a recording system in accordance with a preferred embodiment of the present invention.

FIG. 1 illustrates a simplified block diagram of a recording system in accordance with a preferred embodiment of the present invention. Recording system 100 includes multiple recording devices 110 and a transcription computer 120.

Recording devices 110 are used to record human speech, although they could be used to record other sounds as well. In a preferred embodiment, one recording device 110 is dedicated to each of multiple speakers who are participating in a meeting, teleconference, trial, or other simultaneous proceeding. FIG. 1 illustrates three recording devices 110, which would be used to record the simultaneous utterances from three individuals. In other systems, more or fewer recording devices may be included or utilized.

Recording devices 110 store recorded speech in either a digital or analog form. In a preferred embodiment, speech is recorded and stored in a digital form onto a portable memory device (e.g., a computer disk or tape), local memory or remote memory (e.g., on a network). Recording devices 110 will be described in detail in conjunction with FIG. 3.

After simultaneous operation of multiple recording devices 110, the recorded speech is transferred to transcription computer 120. Transcription computer 120 accesses multiple files of recorded speech, and transcribes the multiple files into a single sequence of textual representations of the recorded speech. The multiple files could be stored within the memory of transcription computer 120, or they could be accessible from some remote location (e.g., a server). Alternatively, the multiple files could be accessed from one or more portable memory devices. In a preferred embodiment, the files accessed by transcription computer are stored in a digital form, rather than analog. In an alternate embodiment, transcription computer 120 could operate on analog representations of speech. Transcription computer 120 will be described in detail in conjunction with FIG. 4.

Although recording devices 110 and transcription computer 120 are shown as stand-alone devices, in an alternate embodiment, they could be linked together directly or through one or more intermediate devices or network elements.

Figure 2:
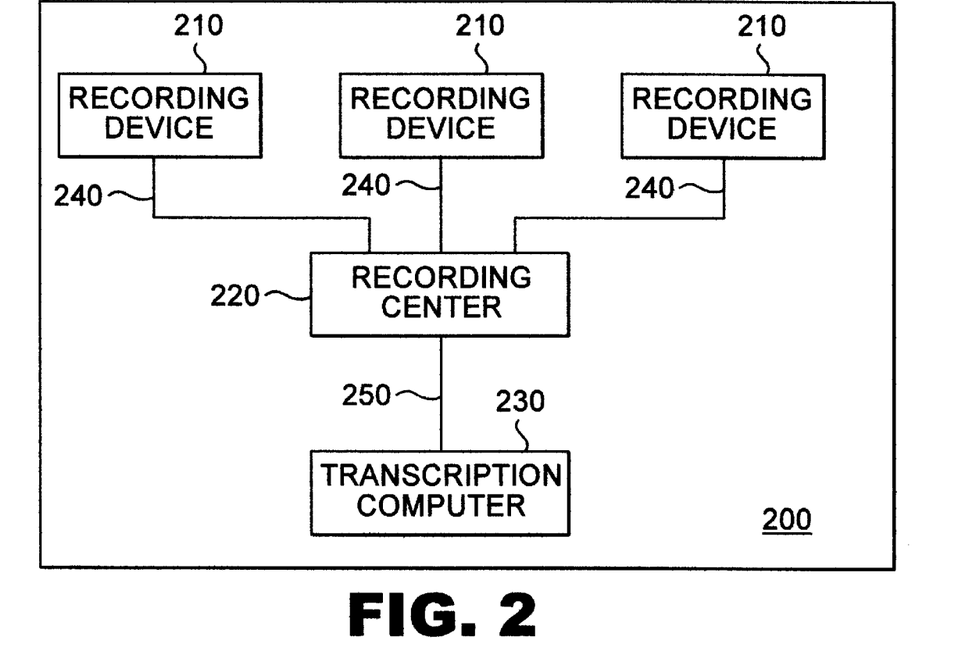
FIG. 2 illustrates a simplified block diagram of a recording system in accordance with an alternate embodiment of the present invention.

FIG. 2 illustrates a simplified block diagram of a recording system in accordance with an alternate embodiment of the present invention. Recording system 200 includes multiple recording devices 210, a recording center 220, and a transcription computer 230.

Recording devices 210 and recording center 220 are linked together through links 240. In a preferred embodiment, links 240 are hardwired, and are capable of carrying digital and/or analog signals. In alternate embodiments, links 240 could be optical, radio frequency, or other types of links. In addition links 240 could be direct links, or could include one or more intermediate transmission points or network elements.

Recording center 220 and transcription computer 230 are linked together through link 250. As with links 240, link 250 could be hardwired, optical, RF, or some other type of link. In addition, link 250 could be a direct link, or could include one or more intermediate transmission points or network elements.

Recording devices 210 are similar to recording devices 110 (FIG. 1), except that recording devices 210 need not, but may, store recorded speech locally. Instead, recording devices 210 could send recorded speech, in a digital or analog form, to recording center 220 over links 240. Recording center 220 would then store separate files for speech recorded by each of the recording devices 210. The inclusion of recording center 220 eliminates the need for physically transferring data from recording devices 210 in order to store the data in a centralized location. Recording devices 210 will be described in detail in conjunction with FIG. 3.

Transcription computer 230 operates in much the same manner as transcription computer 120 (FIG. 1). In this embodiment, transcription computer 230 may obtain the speech files from recording center 220 over link 250. After obtaining the speech files, transcription computer could then transcribe the multiple files into a single sequence of textual representations of the recorded speech. In an alternate embodiment, link 250 may not exist, and the multiple files could be accessed from one or more portable memory devices. The files accessed by transcription computer are desirably stored in a digital form, rather than analog. In an alternate embodiment, transcription computer 230 could operate on analog representations of speech. Transcription computer 230 will be described in detail in conjunction with FIG. 4.

In still other alternate embodiments, transcription computer 230 and recording center 220 could be co-located, have a shared memory, or be the same computer. One of the most important aspects of the present invention is that the recording and transcription system generate multiple recorded files, and that those files are transcribed into a single document. Multiple different configurations for recording and transcribing devices could be imagined by one of skill in the art, and those different configurations are intended to be included within the scope of this invention.

Figure 3:
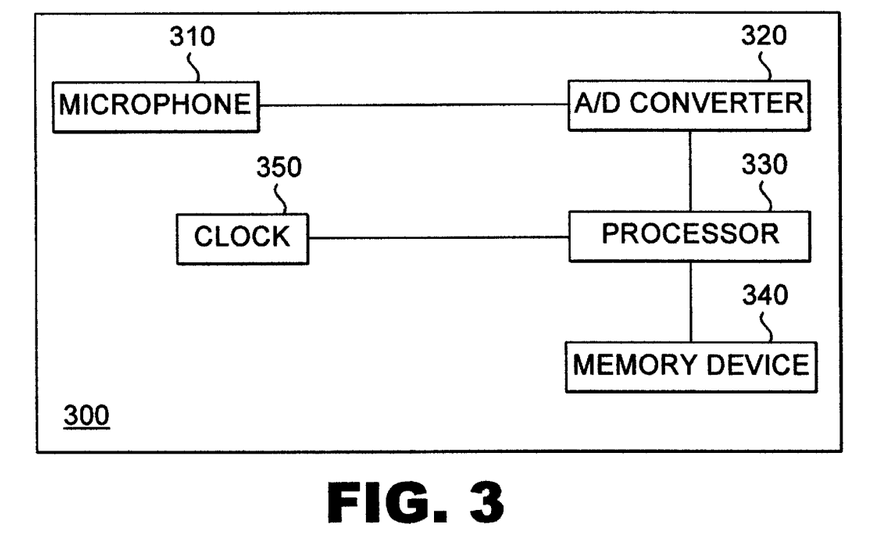
FIG. 3 illustrates a simplified block diagram of a recording device in accordance with a preferred embodiment of the present invention.

FIG. 3 illustrates a simplified block diagram of a recording device in accordance with a preferred embodiment of the present invention. Recording device 300 includes a microphone 310 and a memory device 340. Microphone 310 converts acoustic speech into an analog electrical signal. Memory device 340 stores a representation of that signal, either in analog or digital form. Memory device 340 could be, for example, a remote or local hard drive, RAM, ROM, floppy or compact disk, or other storage medium. In an alternate embodiment such as that shown in FIG. 2, where recording devices send information to a recording center, memory device 340 may not be necessary.

In a preferred embodiment, recording device 300 translates the speech signal from an analog to a digital form. Thus, recording device 300 also includes analog-to-digital (A/D) converter 320 and processor 330. After A/D converter 320 converts the analog electrical signal to a digital representation of the speech, processor 330 may perform some processing of the speech (e.g., pre-filtering or scaling). Processor 330 then stores the speech in memory device 340. In an alternate embodiment, where speech is stored in analog form, A/D converter 320 and processor 330 may not be necessary.

As will be described in more detail below, it is desirable to synchronize the multiple files being transcribed so that the utterances from the various speakers can be placed in a sequential order. Thus, in a preferred embodiment, recording device 300 also includes a clock 350 coupled to processor 330. Clock 350 could keep track of time absolutely (i.e., the actual time), or could keep track of time relatively (i.e., the clock would be set at 0 when the recording began, and would increment from that point). As will be described below, information, or "time stamps," describing certain absolute or relative times could be associated with the speech data by processor 330. That time stamp information would then be used by a transcription computer to sequentially order phrases uttered by the various speakers.

In an alternate embodiment, a clock could be included at a central location (e.g., at recording center 220, FIG. 2), making it unnecessary to have clock 350. A centralized clock would be useful to associate the time with speech data being simultaneously received from multiple recording devices (e.g., recording devices 210, FIG. 2). In addition, a centralized clock would eliminate the need to offset the speech data received from multiple recording devices. In still another alternate embodiment, no time stamp information would be included with the speech at the time of recording. Instead, the transcription computer would assign time stamps during the transcription process.

Figure 4:
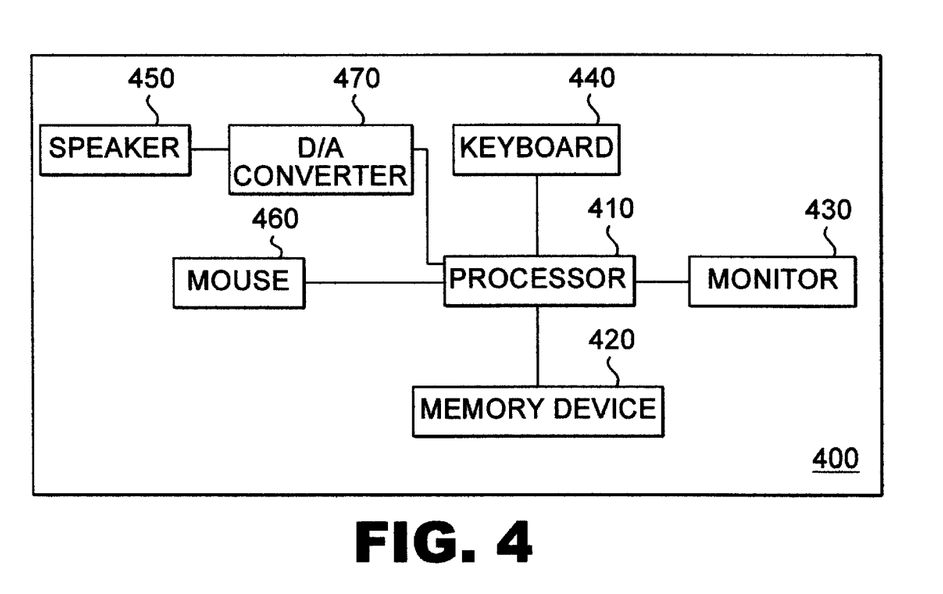
FIG. 4 illustrates a simplified block diagram of a transcription computer in accordance with a preferred embodiment of the present invention.

FIG. 4 illustrates a simplified block diagram of a transcription computer in accordance with a preferred embodiment of the present invention. Transcription computer 400 includes processor 410, memory device 420, monitor 430, keyboard 440, speaker 450, mouse 460, and digital-to-analog (D/A) converter 470. Memory device 420 could be, for example, a remote or local hard drive, RAM, ROM, floppy or compact disk, or other storage medium.

Essentially, speech data that is stored in multiple files within memory device 420 are transcribed by processor 410 in accordance with a preferred embodiment. Transcription is performed using software that implements the method of the present invention, which is described in detail below.

Monitor 430, keyboard 440, speaker 450, and mouse 460 form a user interface with which a user of transcription computer 400 can initiate, control, and monitor the transcription process. For example, the user could use keyboard 440 and mouse 460 to initiate and control execution of the transcription process, which is described in detail below. Transcription computer 400 could provide various screens, via monitor 430, to guide the user through the transcription process, and to enable the user to specify various options and parameters relevant to the transcription. After converting digitized speech to an analog form via D/A converter 470, speaker 450 could provide an audio playback of all or portions of the multiple speech files.

Operation of the transcription system is described in detail in conjunction with FIGS. 5–11. During operations, the transcription system first records speech using multiple recording devices. Data files that include the recorded speech in digital or analog form are then accessed by the transcription computer. The transcription computer then transcribes the multiple files, creating a single file with all transcribed speech information from the multiple files.

Figure 5:
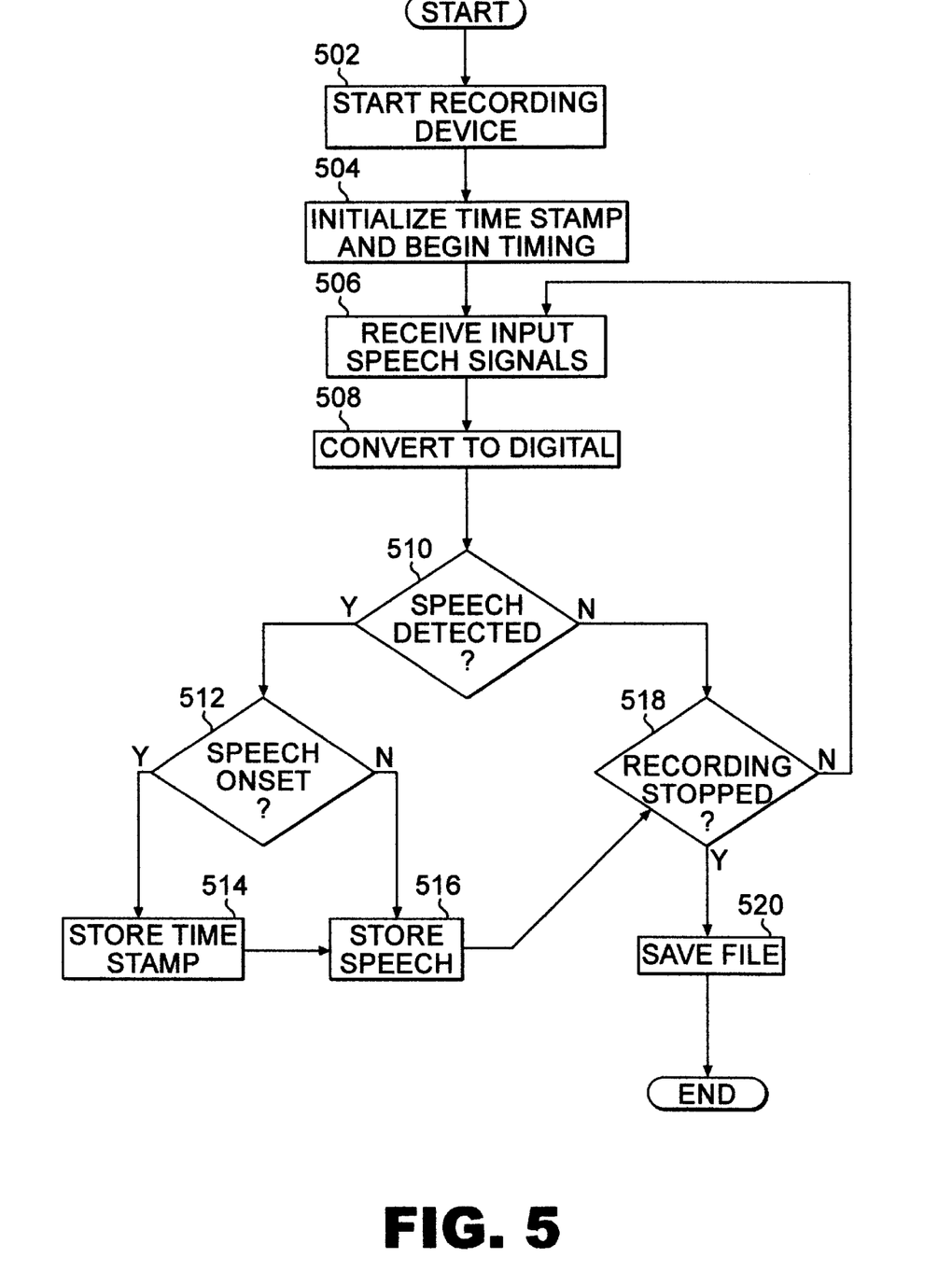
FIG. 5 illustrates a flowchart of a method for creating a file of digitized, recorded speech in accordance with a preferred embodiment of the present invention.

FIG. 5 illustrates a flowchart of a method for creating a file of digitized, recorded speech in accordance with a preferred embodiment of the present invention. The method desirably is performed by a recording device, such as recording device 300 (FIG. 3).

The method begins, in step 502, when the recording device is started. The recording device could be started by the individual whose speech is being recorded, or could be started by a person operating a control panel remote from the recording device. In a preferred embodiment, in step 504, a time stamp is initialized simultaneously with starting the recording device, and the recording device begins timing the recording. The running time stamp is desirably based on a clock signal, which can indicate time in absolute or relative time, as discussed previously.

In any event, once the recording device is started, the device's microphone begins receiving input acoustic speech signals, in step 506, and transforming those signals into analog electrical signals. In a preferred embodiment, the analog electrical signals are then converted, in step 508, into digital data by an analog-to-digital converter.

In a preferred embodiment, this digital speech data is later processed in blocks. For example, blocks of digital speech data, each representing 30 milliseconds (or any other time period) of speech, may be processed. This further processing could include, for example, speech detection and speech-to-text conversion. These processes are described in more detail, below. Alternatively, the speech signals could be separated for analysis in some other manner. For the purposes of this description, it is assumed that the processing is performed on blocks of data.

The recording device may or may not store digital data during periods when the speaker is silent. In a preferred embodiment, the digital data is stored only during periods when the speaker is speaking and during short pauses between words or sentences. In this embodiment, a determination is made, in step 510, whether the recording device detects the speech. If not, the method proceeds to step 518, which will be discussed below. Speech detection could be performed in several different ways, which are well known to those of skill in the art. For example, a signal energy calculation could be performed to determine whether the speech energy is higher than a particular threshold energy. In a preferred embodiment, the speech detection would not exclude short, low-energy periods between words or sentences. Otherwise, upon playback, the recorded speech may sound compressed and unintelligible.

If speech is detected, a further determination is made, in step 512, whether the speech is a speech onset. In a preferred embodiment, a speech onset would be detected when the speaker has just begun uttering a phrase, where a phrase is considered a continuous block of speech bounded by relatively long periods of silence. Desirably, onset detection would not be triggered after short pauses between words, or sentences. Speech onset detection could be performed in several different ways, which are well known to those of skill in the art. For example, an onset may be identified as a time when the speech signal energy changes from a low energy to a high energy within a short period of time. A determination of the signal energy could be determined from analysis of each block of digitized speech.

When a speech onset is detected, a time stamp identifying the time of the speech onset is stored, in step 514. As will be described in more detail, below, this time stamp will be useful during the transcription phase (FIG. 10) to identify when a particular speaker has begun speaking a phrase. The speech is also stored, in step 516 in a file associated with that speaker. As indicated previously, in a preferred embodiment, speech is only stored while the speaker is speaking and during short pauses between words or sentences. Thus, only distinct phrases uttered by the speaker are stored. Long pauses and periods of silence are not stored. This embodiment reduces the amount of memory necessary to record the speech, by eliminating the storage of data during those silent periods.

A determination is then made, in step 518, whether the recording device has been stopped. If so, then the file containing the recorded speech and associated time stamps is saved, in step 520, and the method ends. In a preferred embodiment, the system would provide a speaker with the ability to save the file at other times, as well. For example, the speaker may want to save recorded data to a permanent or temporary file at various times during the recording process in order to ensure that all the data will not be lost if a power or system failure occurs. If the recording device has not been stopped, then the method continues by repeating steps 506–518.

Multiple recording devices operating simultaneously will create multiple files of digitized phrases in the manner described in conjunction with FIG. 5. Typically, the data in these files would be recorded simultaneously during a meeting, teleconference or court proceeding, for example. In some applications, it may be desirable to create files containing data that was not recorded simultaneously. In any event, each of the multiple files includes data representing the phrases uttered by a particular individual, and the time stamps associated with the onsets of those phrases. The multiple files are then transcribed, in accordance with a preferred embodiment, into a single file which includes a sequential listing of textual representations of the phrases uttered by the multiple speakers. The description associated with FIGS. 6–11 describes the transcription process in detail. In a preferred embodiment, the method described in conjunction with FIGS. 6–11 is implemented primarily in software and performed by a transcription computer, such as transcription computer 400 (FIG. 4), which is operated by a human or automated user.

Figure 6:
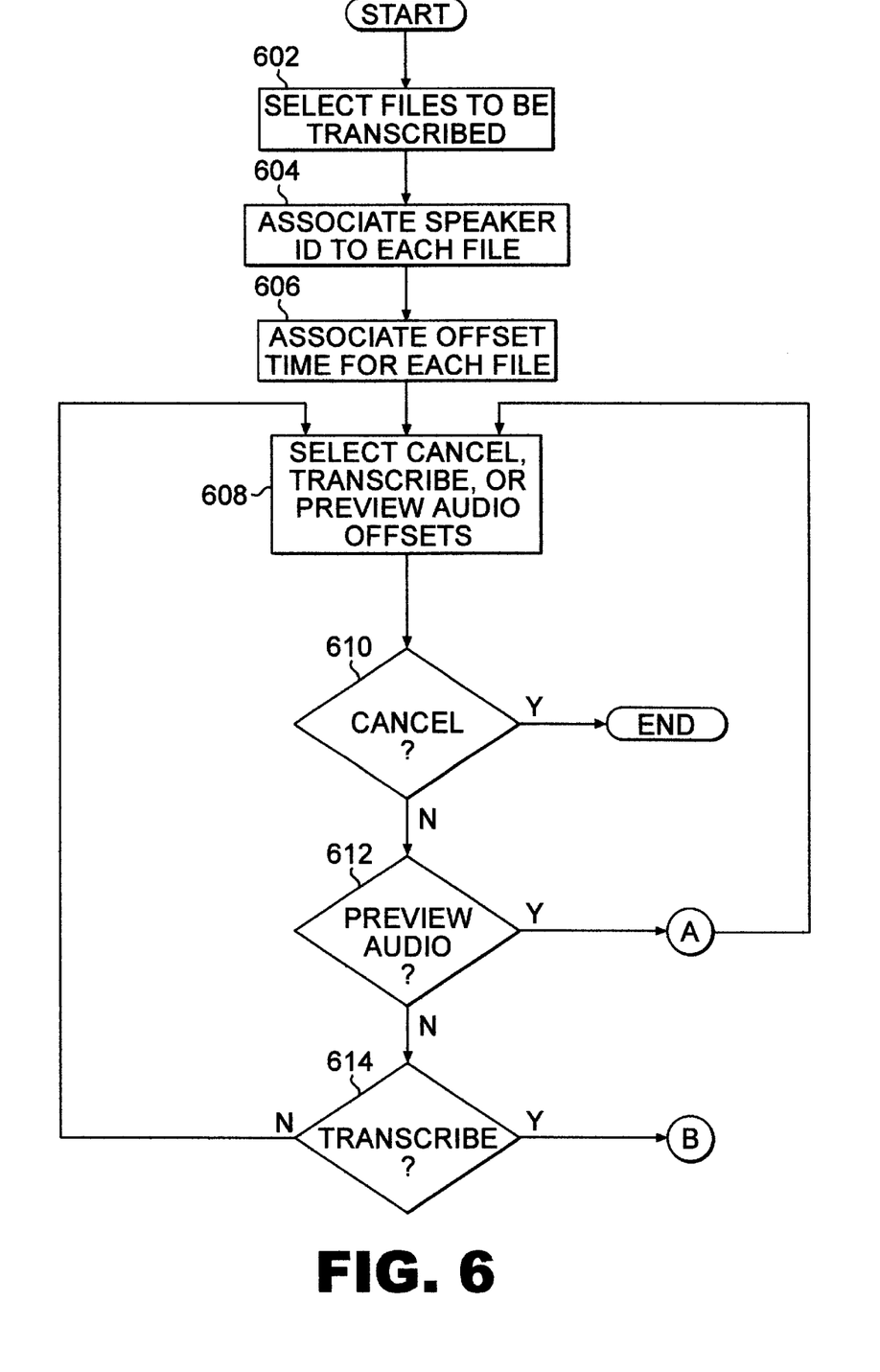
FIG. 6 illustrates a flowchart of a method for initiating transcription of multiple digital speech files in accordance with a preferred embodiment of the present invention.

FIG. 6 illustrates a flowchart of a method for initiating transcription of multiple digital speech files in accordance with a preferred embodiment of the present invention. The method begins, in step 602, when the files to be transcribed are selected. Desirably, the files to be transcribed are directly accessible to the transcription computer. For example, the files to be transcribed could be located on the computer's hard drive, on a disk or other portable storage medium, or on a network accessible to the computer. In a preferred embodiment, a graphical user interface, or display screen, is provided by the transcription computer to aid in the selection of files to be transcribed.

Figure 7:
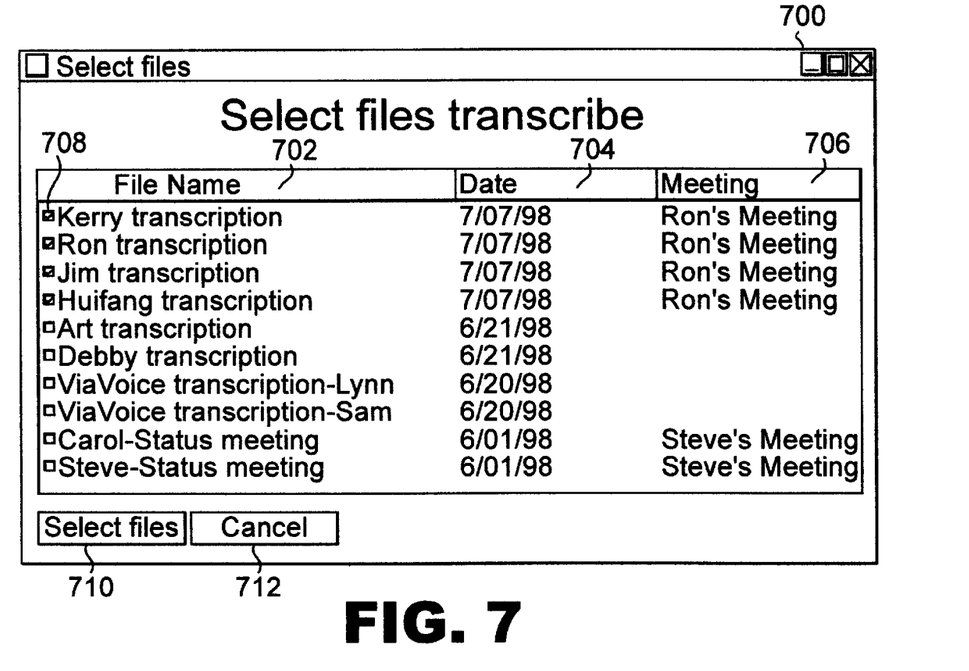
FIG. 7 illustrates an exemplary display screen used for selection of digital files to be transcribed in accordance with a preferred embodiment of the present invention.

FIG. 7 illustrates an exemplary display screen used for selection of digital files to be transcribed in accordance with a preferred embodiment of the present invention. Display screen 700 is displayed on the transcription computer monitor. Display screen 700 desirably lists a set of file names 702 from which the user can select. Display screen 700 can include other information relating to the files, such as, for example, the date 704 the file was created or last edited, and information 706 describing the relationship of the file to other files. For example, all files recorded during the same meeting could include the name of the meeting in field 706.

In order to select particular files, the user can use the mouse to check boxes 708 next to the names of those files the user wishes to have transcribed. When the user is done selecting files, the user can then click a "Select Files" button 710. Alternatively, the user can click a "Cancel" button 712, which would cancel the file selection operation. Various user prompts could then be provided to return the user to a previous stage in the transcription process, or to quit the process completely.

In alternate embodiments, numerous different ways of selecting files could be provided. The display screen 700 shown in FIG. 7 is for the purpose of example only, and should not be construed to limit the scope of the invention. All file selection methods which would be obvious to one of skill in the art are intended to be encompassed within the scope of the invention.

Referring back to FIG. 6, after the files are selected, the user is prompted to associate a speaker identification ("ID") to each selected file in step 604. As will be described in more detail below, the speaker ID will be useful to indicate, in the transcribed file, which speaker uttered each transcribed phrase. In addition, if the speaker ID identifies an "enrolled speaker," the speaker ID can be used to load the enrolled speaker's speaker dependent model into the transcription computer.

An enrolled speaker is a speaker who has previously trained the speech recognition engine. During the training process, the system creates a speaker dependent model which is unique for the particular speaker. The speaker dependent model can then be used, during later transcription sessions, to better transcribe the enrolled speaker's speech.

An unenrolled speaker is a speaker who has not previously trained the speech recognition engine. Consequently, speaker dependent models do not exist for unenrolled speakers. Instead, a speaker independent model is used to transcribe an unenrolled speaker's speech. In a preferred embodiment, once the speech of an unenrolled speaker has been transcribed, a system user can enroll the speaker by prompting the system to create a speaker dependent model for the speaker from the transcribed text. Preferably, the speaker dependent model would be created after the transcribed text has been corrected.

In a preferred embodiment, the same or different names could be used for indicating which speaker uttered a phrase in the transcribed file and for identifying an enrolled speaker for the purposes of loading a speaker dependent model. For example, where the former type of name is the speaker ID, the latter type of name could be the "speaker enrollment ID."

In step 606, the user is prompted to associate an offset time for each file as well. The offset time indicates a time difference between a beginning of the recording session and a beginning of the file. For example, if a recording session began at 8:00, but a particular speaker did not turn on his recording device until 8:15, then the offset time would be 15 minutes. A more common case may be where each speaker turned on his or her recording device within a period of a few seconds of each other. The user of the transcription computer may not know the exact offsets for each file. Thus, an opportunity is provided later for the user to adjust the file offsets, as will be discussed in more detail below. As with step 602, in a preferred embodiment, a display screen is provided by the transcription computer to aid in associating speaker IDs and offsets with file names.

Figure 8:
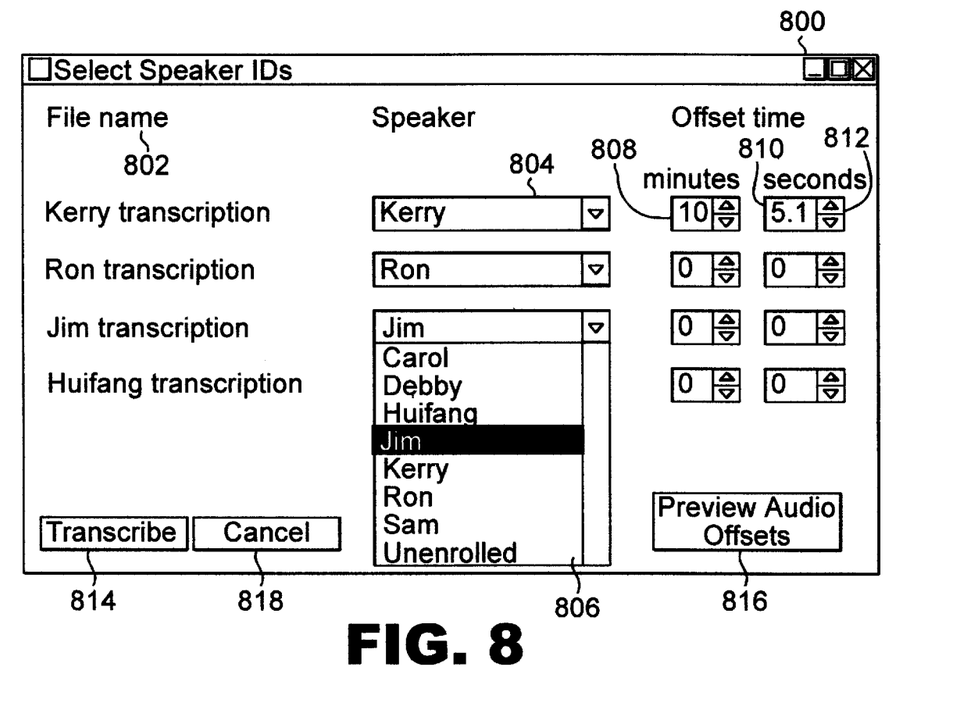
FIG. 8 illustrates an exemplary display screen used for selection of user ID and offset times in accordance with a preferred embodiment of the present invention.

FIG. 8 illustrates and exemplary display screen used for selection of user ID and offset times in accordance with a preferred embodiment of the present invention. Display screen 800 is displayed on the transcription computer monitor. Display screen 800 desirably lists the set of file names 802 that the user selected in step 602. Next to each file name, the user can enter an identifier (e.g., a name) for the speaker. The identifier can be entered by typing the speaker's name into the name box 804, or by selecting the name from a list of names provided on a drop-down scroll box 806. The selected names will be the speaker IDs that transcription computer uses to identify phrases spoken by a particular individual. Where different names are used for identifying phrases spoken by a particular individual and for identifying an enrolled speaker for the purposes of loading a speaker dependent model (e.g., a speaker ID and a speaker enrollment ID), display screen 800 could include an additional column (not shown) for identifying each speaker's speaker dependent model, if one exists.

Next to the speaker name, the user can then select an offset time for each file. The default offset time is 0 minutes and 0 seconds. Unless the user enters a new offset time in the minutes and seconds boxes 808, 810 of the display screen 800, then the default offset time will be used. As with the speaker name, the user could enter the offset by typing the offset into boxes 808, 810, or by clicking up or down arrows 812 provided within each box.

In a preferred embodiment, when a file offset is changed, the files time stamps are each adjusted to reflect the offset.

For example, if the time stamp for a particular phrase indicates that the phrase began at 1 minute, 30 seconds, and the file offset is changed to 15 seconds, then the time stamp for that phrase would be adjusted to 1 minute, 45 seconds. In an alternate embodiment, when an offset is changed, the desired effect of the modified offset could be incorporated into the real-time transcription process.

When the user is done associating speaker IDs and offset times to each file, the user can cause the transcription process to continue by clicking the "Transcribe" button 814 or the "Preview Audio Offsets" button 816. Alternatively, the user can click the "Cancel" button 818, which will cancel the speaker ID and offset association process.

Referring back to FIG. 6, the user selects from the cancel, transcribe or preview audio offset options in step 608. If a determination is made, in step 610, that the user selected the cancel option, then the method ends. Various user prompts could then be provided to return the user to a previous stage in the transcription process, or to quit the process completely.

Figure 9:
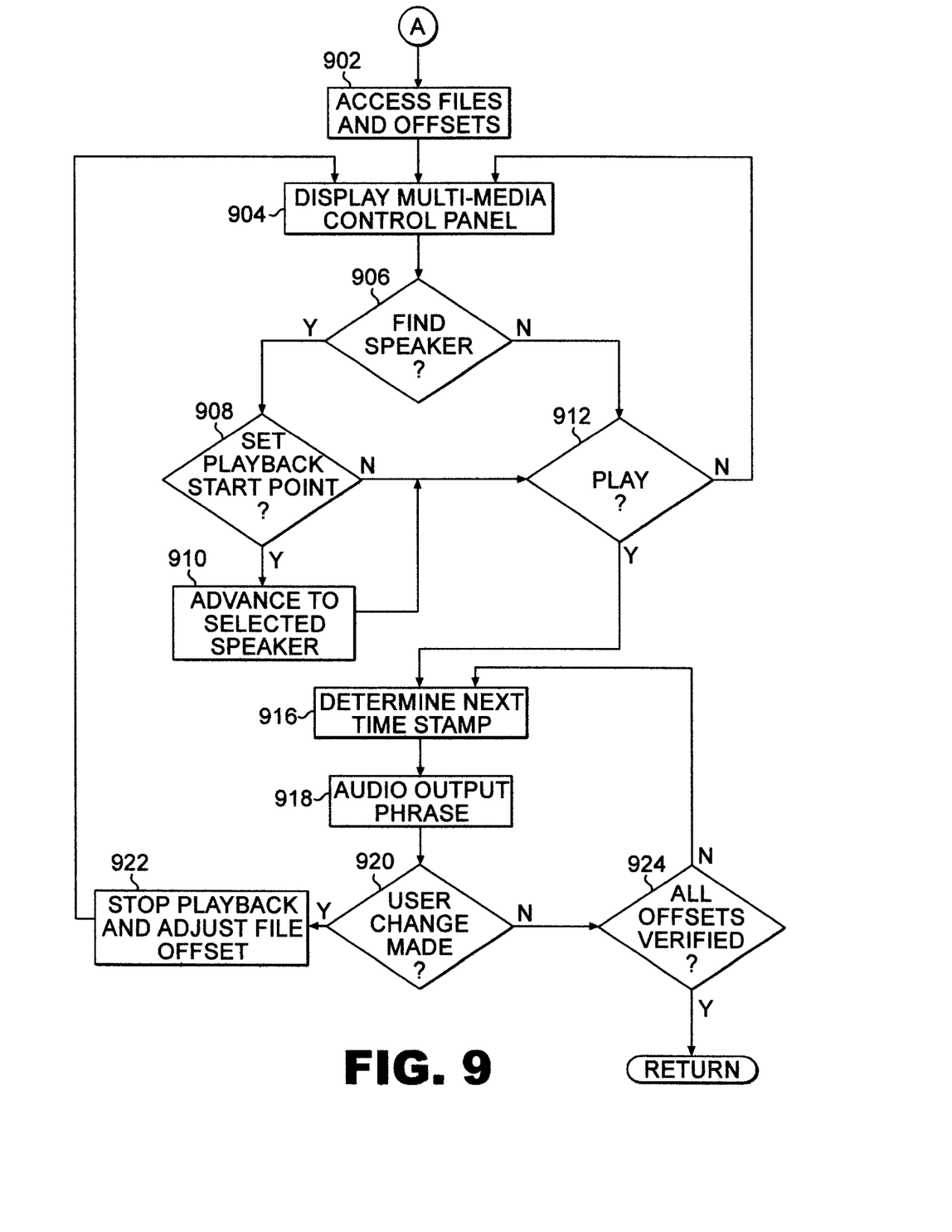
FIG. 9 illustrates a flowchart of a method for previewing an audio representation of the combined files and adjusting file offsets in accordance with a preferred embodiment of the present invention.

If a determination is made, in step 612, that the user selected the preview audio offset option, then the initiation process continues by performing the process described in detail in conjunction with FIG. 9. If a determination is made, in step 614, that the user selected the transcribe option, then the initiation process is complete, and the transcription process will begin. The transcription process is described in detail in conjunction with FIG. 10. If no selection has yet been made, the process waits for additional user input by returning to a previous step, such as step 608. The user could return to any other step of the method before exiting.

FIG. 9 illustrates a flowchart of a method for previewing an audio representation of all selected files and adjusting file offsets, if desired, in accordance with a preferred embodiment of the present invention. When a user has indicated, in step 608 (FIG. 6) that he would like to preview an audio offset, the method of FIG. 9 is executed. Essentially, a preview of the audio offset entails the transcription computer outputting, via a speaker, a chronological sequence of the phrases included within the multiple files. This output takes into account any offsets that the user may have set for any of the files. By previewing the audio, the user can determine whether he needs to adjust the offset of any particular file.

The method begins, in step 902, by accessing the multiple files to be transcribed, along with the offsets pre-set by the user. All or portions of the files may be retrieved into RAM, if space permits. Alternatively, the files may be accessed from a hard drive, disk or network.

In step 904, the transcription computer displays a multimedia control panel on the computer monitor. The control panel desirably has standard audio file controls, implemented as buttons. For example, the user would be able to select between "play," "stop," "pause," "fast forward," and "rewind" functions. The control panel also includes a "quit" button that enables the user to quit the audio preview at any time before or during playback. If the user clicks the "quit" button, then the audio playback process ends, and the method returns to step 608 (FIG. 6).

In a preferred embodiment, the control panel also includes a special function, referred to as the "find speaker" function. The "find speaker" function desirably includes a drop-down list of available speakers (e.g., similar to drop-down scroll box 806, FIG. 8) and a "find" button. This function would enable the user to advance to the first utterance of a particular speaker, rather than starting at the first utterance of the speaker with the earliest time stamp.

If, in step 906, the user implements the "find speaker" function by selecting a speaker from the speaker list and clicking "find," then step 908 is performed. In step 908, the user is given the option to have the system advance the playback to the first utterance by the selected speaker. If the user indicates that he wants the system to advance, then in step 910, the system identifies the first utterance for playback as the first utterance by the selected speaker. When the user later clicks "play," that first utterance will be the first utterance output to the audio system. In an alternate embodiment, the system could "back up" one or more utterances, so that when the user clicks "play," one or more utterances before the selected speaker's first utterance are output in order to give the user the context in which the selected speaker's utterance was made. After performing step 910 or if the user indicates that he does not want the system to advance, then the method continues with step 912.

If the user has not selected the "find speaker" function in step 906, or if that function has been completed, then in step 912, a determination is made whether the user has clicked "play." If not, the method waits by returning to step 904.

If the user has clicked "play," then in step 916, the transcription computer determines from which time stamp to begin the playback. During the first iteration of steps 916–924, if the user has not previously selected the "find speaker" function, then the playback begins at the first time stamp, which corresponds to the onset of the first phrase uttered by any of the speakers. If the user previously selected the "find speaker" function, then, during the first iteration, the playback begins at the time stamp for the first utterance by the selected speaker.

At almost any time before or during playback, the user may interrupt the playback or cause the playback to advance or rewind to a later or earlier time stamp. This may be done, for example, if the user clicks the "stop," "pause," "rewind," or "fast forward" buttons, or when the user indicates that he wants to change an offset. If a playback interruption occurs, and the "play" button is later clicked, the point at which the playback begins will depend on where the user interrupted playback or to which point the user forwarded or rewound the playback.

Once the "play" button has been clicked, then in step 918, an audio representation of the phrase at the next time stamp is output via the speaker. The system then continuously outputs each subsequent phrase from the various speakers by repeating steps 916, 918, and decision steps 920 and 924 until the user indicates that he wants to change an offset, the user indicates that all offsets have been verified, or the user has selected some other function from the control panel.

If, in step 920, the user has indicated that he would like to change an offset, then in step 922, the transcription computer stops the playback and adjusts the offset time to a time specified by the user. The method then continues by returning to step 904. If the user again selects "play" in step 912, then the playback would begin at the point at which the playback was interrupted or at some other point controlled by the user.

If, during playback, the user indicates in step 924 that all offsets have been verified, then the preview audio method ends and the method returns to step 608 (FIG. 6). Otherwise, the method continues to play back the utterances by returning to step 916 until the user alters the playback flow or indicates that he desires to quit.

Figure 10:
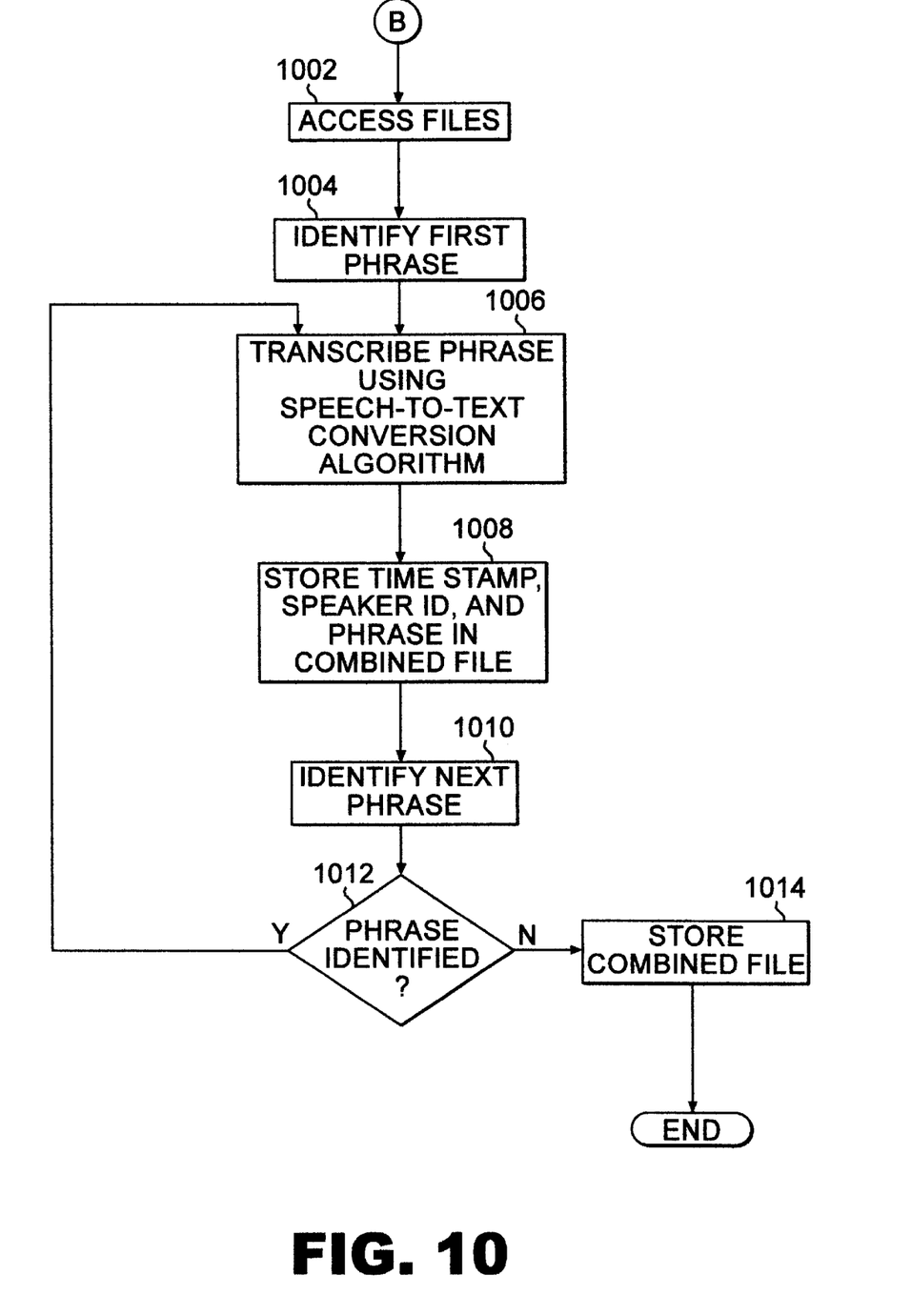
FIG. 10 illustrates a flowchart of a method for transcribing multiple files into a single document in accordance with a preferred embodiment of the present invention.

Referring again to FIG. 6, if a determination is made, in step 614, that the user selected the transcribe option, then the transcription process will begin. FIG. 10 illustrates a flowchart of a method for transcribing multiple files into a single document in accordance with a preferred embodiment of the present invention.

The method begins, in step 1002, when the method accesses the multiple files to be transcribed. All or port ions of the files may be retrieved into RAM, if space permits. Alternatively, the files may be accessed from a hard drive, disk, or network.

As described previously, in a preferred embodiment, file offsets would have been compensated for by adjusting the time stamps within a file whose offset was modified. If, in an alternate embodiment, such an adjustment had not been made, then the file offsets would also be retrieved. In the alternate embodiment, the transcription of a particular file would not begin until an amount of time had passed equal to the file's offset.

In step 1004, the method proceeds by identifying the first uttered phrase, as indicated by the phrase time stamps in each of the files. The first uttered phrase would be the phrase identified by the earliest time stamp.

After identification of the first uttered phrase, the phrase is transcribed, in step 1006 using a speech-to-text conversion algorithm. Many speech-to-text conversion techniques would be known to those of skill in the art.

The textual representation of the converted phrase is then stored, in step 1008, in a "combined file," along with the time stamp and the speaker ID corresponding to the phrase. The combined file, ultimately, will include a chronological listing, in text form, of all phrases represented in the multiple files.

Based on the phrase time stamps in the multiple files, the method then attempts, in step 1010, to identify a next phrase, which on a first iteration, would be the phrase that occurs next after the first phrase. Eventually, no phrases will remain to be transcribed. Therefore, it is possible that the method will not be able to identify a next phrase. Accordingly, a determination is made, in step 1012, whether a next phrase is identified. If so, then the method repeats steps 1006–1012, resulting in the next phrase being transcribed and stored in the combined file. In a preferred embodiment, the next phrase would be added to the combined file in a chronological order. If no next phrase is identified in step 1012, then the method assumes that all phrases have been transcribed, the combined file is stored in step 1014, and the method ends.

In a preferred embodiment, the method of FIG. 10 is performed automatically without significant user intervention. In an alternate embodiment, the user could be an interactive part of the transcription process, starting and stopping the process as he wishes. In such an embodiment, the user could edit the transcription as it is being created. Editing the transcription, whether done during the transcription process or afterward, is described in more detail in conjunction with FIG. 11.

As stated previously, the result of the transcription process described in conjunction with FIG. 10 is a file which sequentially lists textual representations of phrases uttered by multiple speakers, where those phrases were recorded using multiple recording devices. When the combined file is displayed, the phrases may look something like the following example, which specifies the time, speaker ID, and converted phrase:

| Time | Speaker ID | Phrase |
| --- | --- | --- |
| 00:00:01 | Ron | Well I'm glad that you all could come |
| 00:00:06 | Ron | I hope you all are fine |
| 00:00:08 | Huifang | Yes |
| 00:00:08 | Jim | Yes |
| 00:00:10 | Huifang | Glad to be here |
| 00:00:10 | Jim | So ah |
| 00:00:13 | Jim | What's the meeting about |
| 00:00:15 | Huifang | How long will it last |

The "Time" column represents the time stamp associated with a particular phrase. The "Speaker ID" column identifies the speaker ID associated with the file from which the phrase was transcribed. The "Phrase" column includes the textual representation of the phrase which began at the identified time stamp, and which was transcribed from the file associated with the identified speaker ID.

As the time stamps indicate, multiple phrases may have been uttered by multiple speakers simultaneously. For example, at time 00:00:08, both Huifang and Jim said "Yes." This illustrates some of the advantages of the present invention. First, the present invention enables an accurate identification of the individual who has uttered the particular phrase without having to employ speech recognition or other techniques. Second, speech is accurately transcribed, even when multiple speakers are talking at the same time.

In a preferred embodiment, the method could include an automatic editing feature, which could perform various functions to "clean up" the transcribed text. For example, spelling, grammar, and punctuation functions could be executed to improve the accuracy and readability of the transcribed text. Also in a preferred embodiment, the user could manually edit the transcribed sequence or could edit the speaker ID. Besides editing the phrases and speaker IDs, a preferred embodiment of the present invention gives the user the ability to edit the sequence in which the phrases occur.

Figure 11:
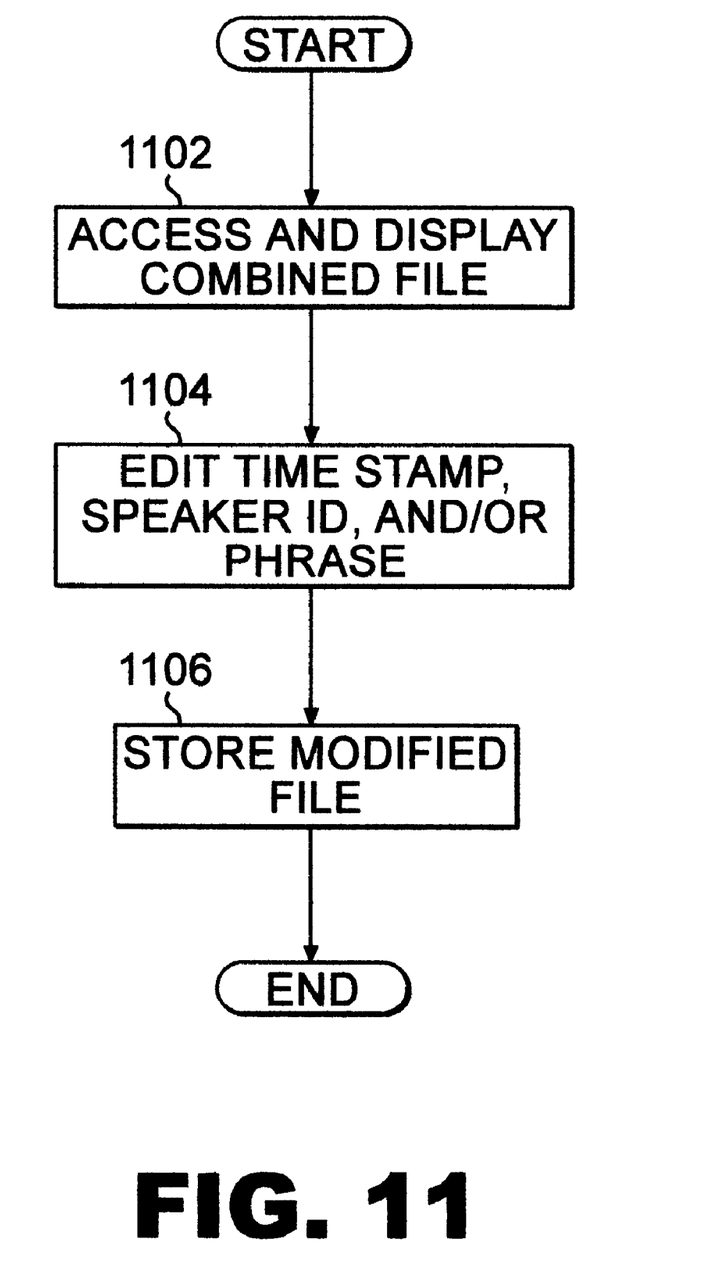
FIG. 11 illustrates a flowchart of a method for editing a transcribed document in accordance with a preferred embodiment of the present invention.

FIG. 11 illustrates a flowchart of a method for editing a transcribed document in accordance with a preferred embodiment of the present invention. Unless the transcribed document is already being displayed, the method begins by retrieving and displaying the combined file in step 1102.

In step 1104, the user edits the phrase time stamp, speaker ID, and/or phrase. In a preferred embodiment, this is done by the user typing over the numbers or words he wishes to change. When the user edits the time stamp associated with a particular phrase, the user is given several options for how the edited time stamp should be treated in a preferred embodiment. For example, the user could indicate that he wants the phrase to be moved in the sequence without affecting the time stamps of any other phrase. The phrase would then be moved automatically to a position within the transcribed sequence that corresponds to the new time stamp. To illustrate using the previous example, when the user edits the time of Huifang's second uttered phrase from 00:00:10 to 00:00:14, the phrase would be moved in the sequence as follows:

| Time | Speaker ID | Phrase |
| --- | --- | --- |
| 00:00:01 | Ron | Well I'm glad that you all could come |
| 00:00:06 | Ron | I hope you all are fine |
| 00:00:08 | Huifang | Yes |
| 00:00:08 | Jim | Yes |
| 00:00:10 | Jim | So ah |

-continued

| Time | Speaker ID | Phrase |
|------|------------|--------|
| 00:00:13 | Jim | What's the meeting about |
| 00:00:14 | Huifang | Glad to be here |
| 00:00:15 | Huifang | How long will it last |

Alternatively, the user could indicate that he wants the difference between the edited and unedited time stamps to be added (or subtracted) from all of a particular speaker's phrases that follow the new time stamp. The method would then add or subtract the difference accordingly, to the time stamps associated with that speaker. Using the first example, when the user edits the time of Huifang's second uttered phrase to 00:00:14, the second phrase would be moved in the sequence, and the time stamp of Huifang's third utterance would be changed to reflect the 4 second difference as follows:

| Time | Speaker ID | Phrase |
|------|------------|--------|
| 00:00:01 | Ron | Well I'm glad that you all could come |
| 00:00:06 | Ron | I hope you all are fine |
| 00:00:08 | Huifang | Yes |
| 00:00:08 | Jim | Yes |
| 00:00:10 | Jim | So ah |
| 00:00:13 | Jim | What's the meeting about |
| 00:00:14 | Huifang | Glad to be here |
| 00:00:19 | Huifang | How long will it last |

The user may also indicate that he wants time stamps associated with other or all speakers to be adjusted by the difference.

The user also may be provided the ability to select, drag, and drop phrases at different locations. The time stamp for the phrase would then be adjusted to reflect the phrase's new position within the sequence. Thus, if Huifang's first uttered phrase from the first example were dragged and dropped after Jim's last uttered phrase, the sequence would be modified as follows:

| Time | Speaker ID | Phrase |
|------|------------|--------|
| 00:00:01 | Ron | Well I'm glad that you all could come |
| 00:00:06 | Ron | I hope you all are fine |
| 00:00:08 | Jim | Yes |
| 00:00:10 | Jim | So ah |
| 00:00:13 | Jim | What's the meeting about |
| 00:00:12 | Huifang | Yes |
| 00:00:14 | Huifang | Glad to be here |
| 00:00:19 | Huifang | How long will it last |

As part of the editing process, the user could request that, where a speaker utters multiple phrases in sequence, the method delete the redundant listing of the speaker ID. In addition, the user could request that only the time stamp be shown for the first of a sequence of multiple phrases uttered by a particular speaker. If these editing options were employed, the sequence of phrases from the previous example would be edited as follows:

| Time | Speaker ID | Phrase |
|------|------------|--------|
| 00:00:01 | Ron | Well I'm glad that you all could come |
| | | I hope you all are fine |
| 00:00:08 | Jim | Yes |
| | | So ah |
| | | What's the meeting about |
| 00:00:12 | Huifang | Yes |
| | | Glad to be here |
| | | How long will it last |

Numerous other editing functions could also be employed to modify or format the text in different ways. Referring back to FIG. 11, after the user has edited the phrase sequence to his satisfaction, the modified file is stored, in step 1106, and the method ends.

In conclusion, the method and apparatus of the present invention provide a way to accurately transcribe, into a single file, speech uttered by multiple speakers. The method is accomplished by recording each of the multiple speakers' utterances using separate recording devices, and storing the separately recorded speech into multiple files. The multiple files are then transcribed together, using the method of the preferred embodiment and speech-to-text conversion techniques, to create a single file which includes a chronological sequence of uttered phrases. The transcribed sequence of text can then be edited automatically or manually by the user of the transcription computer.

Thus, a method and apparatus for transcribing multiple files into a single document have been described which overcome specific problems, and accomplish certain advantages relative to prior art methods and mechanisms. Specifically, the method and apparatus of the present invention provide the ability to automatically produce an accurate, combined transcription when multiple speakers are simultaneously participating in a meeting or other conversation. In addition, the method and apparatus provide the ability to identify who uttered a particular phrase at what time. The method and apparatus of the present invention also enables the transcription to be edited easily by the user or automatically.

The foregoing descriptions of the specific embodiments will so fully reveal the general nature of the invention that others can, by applying current knowledge, readily modify and/or adapt the embodiments for various applications without departing from the generic concept. Therefore, such adaptations and modifications should, and are intended to be comprehended within the meaning and range of equivalents of the disclosed embodiments. In particular, while a preferred embodiment has been described in terms of particular configurations of recording and transcribing apparatus, those of skill in the art will understand, based on the description herein, that the method of the present invention also could be implemented using numerous other apparatus configurations. Moreover, those skilled in the art will appreciate that the flowcharts presented herein are intended to teach the present invention and that different techniques for implementing program flow that do not necessarily lend themselves to flowcharting may be devised. For example, each task discussed herein may be interrupted to permit program flow to perform background or other tasks. In addition, the specific order of tasks may be changed, and the specific techniques used to implement the tasks may differ from system to system.

It is to be understood that the phraseology or terminology employed herein is for the purpose of description, and not of limitation. Accordingly, the invention is intended to embrace all such alternatives, modifications, equivalents, and variations as fall within the spirit and broad scope of the appended claims.

We claim:

1. A method for transcribing multiple independently recorded files of digitized speech data into a single document, the method comprising the steps of:

a) accessing the multiple independently recorded files of digitized speech data, wherein the multiple independently recorded files represent multiple independent speech recordings that were recorded within a single recording session and each of the multiple independently recorded files is associated with a particular user;

b) transcribing the multiple independently recorded files by applying a speech-to-text conversion technique to digitized phrases within each of the multiple independently recorded files in order to convert the digitized phrases to textual representations of phrases, wherein the digitized phrases represent segments of the digitized speech data; and c) storing the textual representations in a time-sequential order in a single file, resulting in a single sequence of textual representations of the digitized phrases from the multiple files.

2. The method as claimed in claim 1, further comprising the step of associating an offset time to a file of the multiple files, wherein the offset time indicates a time difference between a beginning of the recording session and a beginning of the file, and the step of storing the textual representations takes into account the offset time in the placement of phrases in the single sequence.

3. The method as claimed in claim 1, further comprising the step of selecting the multiple files to be transcribed.

4. The method as claimed in claim 1, further comprising the steps of:

d) associating a speaker identification to a file of the multiple files, wherein the speaker identification indicates who uttered phrases within the file; and e) including the speaker identification with each of the textual representations which represent a phrase from the file.

5. The method as claimed in claim 1, further comprising the steps of:

d) associating time stamps to phrases within a file; and e) including the time stamps with the textual representations which represent the phrases from the file.

6. The method as claimed in claim 1, wherein the step of transcribing includes the steps of:

b1) identifying a first phrase from the multiple files, wherein the first phrase represents a phrase which occurs before any other phrase in the multiple files; and b2) applying the speech-to-text conversion technique to the first phrase.

7. The method as claimed in claim 6, wherein the step of transcribing further comprises the steps of:

b3) identifying a next phrase from the multiple files, wherein the next phrase represents a phrase which occurs before any other phrase that has not been transcribed from the multiple files; and b4) applying the speech-to-text conversion technique to the next phrase.

8. The method as claimed in claim 7, wherein the step of transcribing further comprises repeating the steps of identifying a next phrase and applying the speech-to-text conversion technique until no further phrases are identified.

9. The method as claimed in claim 1, further comprising the steps of:

d) accessing the transcribed file; and e) displaying textual representations of the phrases in a chronological order along with associated time stamps.

10. The method as claimed in claim 9, further comprising the step of:

f) modifying the chronological order of the phrases.

11. The method as claimed in claim 10, wherein the step of modifying the chronological order includes the steps of:

f1) changing a first time stamp associated with one of the textual representations to a second time stamp; and f2) re-arranging the textual representations in a new chronological order to take into account the second time stamp.

12. The method as claimed in claim 11, further comprising the steps of:

f3) determining a difference between the first time stamp and the second time stamp; and f4) adding or subtracting the difference to time stamps that occur after the second time stamp.

13. The method as claimed in claim 9, further comprising the step of editing the textual representations of the phrases.

14. A method for transcribing multiple independently recorded files of digitized speech into a single document, the method comprising the step of:

a) accessing the multiple independently recorded files of digitized speech data, wherein the multiple independently recorded files represent multiple speech recordings that were independently recorded into individual files within a single recording session and each individual file of the multiple files is associated with a particular user;

b) outputting, to a speaker, an audio representation of a first phrase from a file of the multiple files;

c) adjusting an offset time associated with the first phrase, wherein the offset time indicates a time difference between a beginning of the recording session and a beginning of the file;

d) transcribing the multiple independently recorded files by applying a speech-to-text conversion technique to digitized phrases within each of the multiple independently recorded files in order to convert the digitized phrases to textual representations of phrases, wherein the digitized phrases represent segments of the digitized speech data; and e) storing the textual representations in a time-sequential order in a single file, resulting in a single sequence of textual representations of the digitized phrases from the multiple files.

15. The method as claimed in claim 14, further comprising repeating the steps of outputting and adjusting until the method is interrupted.

16. A transcription apparatus for transcribing multiple independently recorded files of digitized speech data into a single document, the apparatus comprising:

a processor that accesses multiple independently recorded files of digitized speech data wherein each of the multiple independently recorded files represent multiple independent speech recordings that were recorded within a single recording session and each of the multiple independently recorded files is associated with a particular user, transcribes the multiple independently recorded files by applying a speech-to-text processing technique to digitized phrases within each of the multiple independently recorded files in order to convert the digitized phrases to textual representations of phrases, and stores the textual representations in a time-sequential order in a single combined file; and a memory device for storing the text representations.

17. The apparatus as claimed in claim 16, further comprising a user interface for enabling a user of the apparatus to select the multiple files to be transcribed and to edit the combined file.

18. The apparatus as claimed in claim 16, further comprising:

a digital-to-analog converter for converting the digitized speech data into analog speech signals; and a speaker for outputting the analog speech signals.

19. A machine readable storage, having stored thereon a computer program having a plurality of code sections executable by a machine for causing the machine to perform the steps of:

a) accessing the multiple independently recorded files of digitized speech data, wherein the multiple independently recorded files represent multiple speech recordings that were recorded within a single recording session and each of the multiple independently recorded files is associated with a particular user;

b) transcribing the multiple independently recorded files by applying a speech-to-text conversion technique to digitized phrases within each of the multiple independently recorded files in order to convert the digitized phrases to textual representations of phrases, wherein the digitized phrases represent segments of the digitized speech data; and c) storing the textual representations in a time-sequential order in a single file, resulting in a single sequence of textual representations of the digitized phrases from the multiple files.

* * * * *